April 7, 1942.  W. W. WOOD  2,279,154
SPRING SUSPENSION
Filed Dec. 23, 1940

Inventor
Walter W. Wood
By Frease and Bishop
Attorneys

Patented Apr. 7, 1942

2,279,154

UNITED STATES PATENT OFFICE 2,279,154

SPRING SUSPENSION

Walter W. Wood, Canton, Ohio

Application December 23, 1940, Serial No. 371,270

10 Claims. (Cl. 267—16)

The invention relates to supporting springs for suspending automobiles and other vehicles from the wheel axles; and has for its object the provision of a novel spring suspension which will minimize the destructive effect of road shock upon the vehicle, provide for a saving in power required to surmount road obstacles, lengthen the life of the tires upon the vehicle, increase the riding comfort and ease of control of the vehicle and result in a maximum safety when driven at high speed, and this application is an improvement upon my prior application Serial No. 320,673, now Patent No. 2,238,202, granted April 15, 1941.

Briefly, the invention contemplates a spring suspension between the chassis and wheel axles of a vehicle which will permit the wheel to yield in the exact direction in which it is urged by the reaction of encountering an obstacle upon the road, causing or permitting the chassis to continue its forward movement in a plane substantially parallel to the general plane of the road.

This action is produced by so constructing the improved spring suspension that when a small obstacle is encountered the direction of the reaction from which approaches the vertical, the wheel will yield in a nearly vertical direction with reference to the chassis of the vehicle, while if the obstacle be larger and the reaction therefrom more inclined from the vertical, the wheel will yield in the corresponding direction.

It is another important object of the invention to provide a novel spring suspension for vehicles, which is so constructed and operated that a purely vertical force applied to a wheel spindle will produce recession of the wheel with respect to the chassis.

Figure 1:
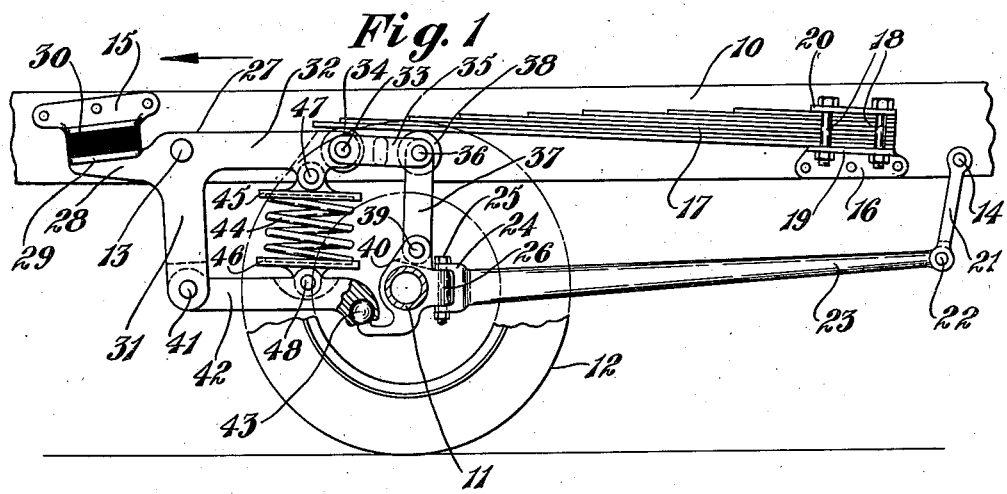
Figure 2:
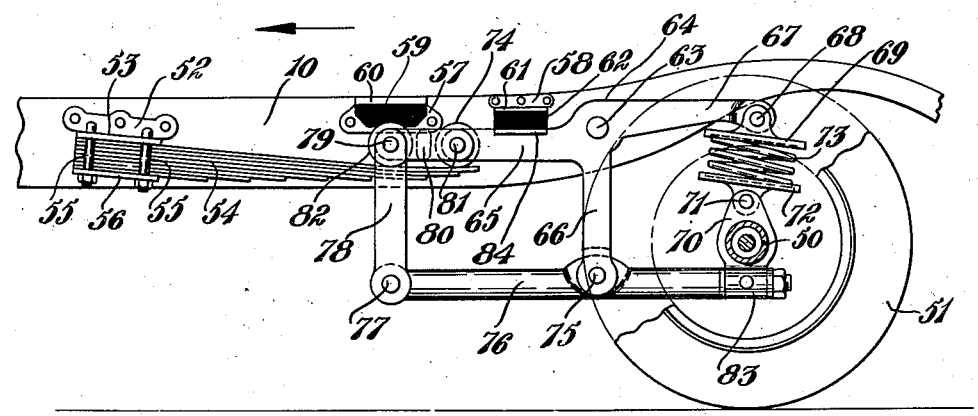

The above objects, together with others which will be apparent from the drawing and following description of one embodiment of the invention, may be attained by constructing the improved spring suspension in the manner illustrated in the accompanying drawing, in which Figure 1 is an elevation of the improved spring suspension especially designed for a front wheel of an automobile or similar vehicle, the left front wheel and spring suspension therefor being shown, parts being broken away for the purpose of illustration; and Fig. 2 is a similar view showing the improved spring suspension as designed for a rear wheel.

Similar numerals refer to similar parts throughout the several views.

Referring first to the construction illustrated in Figure 1 in which a front wheel spring suspension is shown, a portion of the chassis frame of the vehicle is indicated generally at 10, the front axle is shown at 11 and the front wheel is indicated by the numeral 12.

Studs 13 and 14 are fixed upon the chassis frame a short distance in front of the wheel and a relatively greater distance behind the wheel respectively, and brackets 15 and 16 are fixed upon the chassis frame adjacent to the studs 13 and 14, respectively.

The bracket 16 forms an anchorage for the large end of the laminated main spring 17 of the spring suspension, being anchored thereto as by the bolts 18 located through the flange 19 of the bracket and through the top plate 20.

A link 21 is pivoted at its upper end to the rearmost stud 14 and at its lower end, as at 22 to the rear end of the lever 23, the forward end of which is forked as at 24 and pivoted by the substantially vertical pin 25 to the lug 26 which is carried by the axle 11.

A substantially T-shaped lever indicated generally at 27 is pivoted upon the forward stud 13 and comprises the forwardly extending arm 28 having an angular flange 29 adapted to contact the buffer pad 30, of rubber or the like, which is carried by the forward bracket 15; a depending arm 31, and a rearwardly disposed arm 32.

The last named arm carries a pin 33 at its rear end upon which is mounted a roller 34 engaging the under side of the main spring 17 and to which is pivotally connected the forward end of the link or yoke 35, the rear end of which is pivotally connected, as by the pin 36, to the upper end of the link 37.

A roller 38 is carried upon the pin 36 and like the roller 34 always remains in contact with the undersurface of the main spring 17.

The lower end of the link 37 is pivoted as by the pin 39 to the lug 40 fixed upon the axle.

A pin 41 pivotally connects the lower end of the arm 31 to the forward end of the substantially horizontal arm 42, the rear end of which is connected by a flexible ball or universal joint 43 to the axle 11.

A coil spring 44 is located between the spring cups 45 and 46 pivotally connected as at 47 and 48 to the arms 32 and 42, respectively.

In the operation of this form of the invention, when a front wheel 12 encounters a small obstacle the reaction from which is in a nearly vertical direction, the upward thrust transmitted through the axle 11, link 37 and roller 38 acts to flex the main spring 17 to a greater or less extent.

Being thus flexed by the upthrust of the roller 38, the spring 17 would lose its contact with the roller 34 if the latter remains stationary.

However, the wheel 11 in lifting carries with it the rear end of the arm 42 which tends to compress the spring 44, the upward pressure of this spring bearing on the rearward extension 32 of the T-shaped lever, which carries the roller 34, thus, forcing the roller 34 to keep and maintain contact with the spring 17.

This produces a counter-clockwise, oscillation of the T-shape lever 27, causing the depending arm 31, carrying the pin 41, to thrust rearward, and communicating this rearward thrust to the axle 11, through the arm 42, forces the axle to travel rearward with respect to the chassis frame 10.

It will thus be obvious that the construction and operation of this mechanism is such that a vertical force exerted upon the axle causes the axle to recede or lag with respect to the frame, a feature which is of the greatest importance in a vehicle spring suspension.

In the event a larger obstacle is encountered by the wheel, the horizontal component of the reactive force is greater relative to the vertical component, and acts directly to force recession or lag of the axle.

A point is reached in the increasing ratio of horizontal component to vertical component where the receding axle, pulling on the pin 41 through the arm 42, creates a counter-clockwise rotation of the T-shape lever 27, about the stud 13, and the roller 34 carried by the rearward extension 32, of the T-shape lever, flexes the spring 17 so that the spring would tend to break contact with the roller 38.

However, the reactive force from any obstacle which the wheel could possibly surmount would necessarily have a considerable vertical component, and thus, as the wheel surmounts the obstacle the axle is forced upward and through the link 37 maintains contact between the roller 38 and the spring 17.

Special note is made of the fact that since the spring 17 is flexed by the horizontal component, all pressure is removed from the roller 38, and the wheel is more or less free to rise over the obstacle, impelled as by its own momentum, the roller 38 merely following the spring 17, and its contact with the spring forming the limit of the range of free or unrestricted rise of the wheel.

In Fig. 2 is shown in elevation, as from the left side of the vehicle, the arrangement of spring suspension preferred for springing the rear axle, and adapted to be used in combination with the front axle arrangement illustrated in Fig. 1, and above described.

With the construction illustrated, the rear axle housing is represented at 50 and the rear wheel at 51, the rear portion of the chassis frame 10 being also shown. A bracket 52 is fixed upon the frame at a point considerably forward of the rear axle, and provided with an angular flange 53.

The rearwardly disposed, laminated spring 54 is attached to the bracket 52 by means of the bolts 55 located through the flange 53 and the bottom plate 56 and clamping the larger or forward end of the spring therebetween.

Brackets 57 and 58 are located at spaced points upon the frame 10 between the spring bracket 52 and the rear axle. A buffer pad 59 is connected to the under side of the angular flange 60, formed upon the bracket 57, and an angular flange 61 is formed upon the bracket 58, to the under side of which is connected a buffer pad 62.

A stud 63 is carried by the chassis frame at a point between the bracket 58 and the rear axle, and a T-shape lever 64 is pivotally mounted thereon and comprises the forwardly extending arm 65, the depending arm 66 and the rearwardly disposed arm 67, upon which is a pin 68 carrying the spring cup 69.

The lug or flange 70, formed upon the rear axle, carries a pin 71 to which is pivoted a spring cup 72, and a coil spring 73 is mounted between said cups and tends to urge the arm 67 upward, so as to normally hold the roller 74, journaled upon the forward end of the arm 65, in contact with the free end portion of the laminated spring 54.

The depending arm 66, of the T-shape lever, carries the pin 75, upon which the lever 76 is fulcrumed intermediate its ends. The forward end of the lever 76 carries a pin 77 to which is pivoted the lower end of a link 78 the upper end of which is pivoted as by the pin 79 to a yoke link 80 the rear end of which is pivoted to the forward end of the arm 65 as by the pin 81 upon which the roller 74 is journaled.

A roller 82 is journaled upon the pin 79 and bears upon the top of the spring 54 at a point slightly spaced from the end thereof. The rear end of the lever 76 is connected to the rear axle by means of a suitable flexible or universal joint as indicated generally at 83.

The buffer pad 62 engages the angular flange 84 upon the forwardly extending arm 65 of the T-shape lever to limit the clock-wise rotation of the same about the stud 63.

The buffer pad 59 carried by the bracket 57 limits the upward travel of the roller 82 upon the upper end of the link 78 carried by the lever 76, thus, acting to prevent the rear axle from dropping too far below the frame 10 in case of a severe bounce, or when the car is jacked up.

In the operation of the rear spring suspension, when the direction of the reactive force from an obstacle is nearly vertical, as in the case of small obstacles, when the rear axle 50 is forced upward the lever 76 pulls downward on the link 78 and roller 82 flexing the spring 54.

This would tend to separate the spring 54 from the roller 74, but as the rear axle rises it also tends to compress the coil spring 73 and this pressure causes the T-shape lever 64 to rotate around the stud 63 in a counter-clockwise direction maintaining contact between the roller 74 and the spring 54.

The rotational movement of the T-shape lever 64, however slight, forces the rear axle 50 to recede with respect to the frame 10, giving the wheel more time in which to surmount the obstacle.

If the obstacle be large, so that the reaction contains a considerable horizontal component, this horizontal component acting rearwardly on the rear axle 50 pulls on the pin 75, through the lever 76, and causes a counter-clockwise movement of the T-shape lever 64 which forces the roller 74 downward flexing the spring 54 and at the same time carrying the pin 68 upward, by the counter-clockwise rotation of the T-shape lever, and relieving the rear axle of all downward pressure from the spring 73.

The reaction from any obstacle which the wheel can surmount at all will necessarily have a considerable vertical component which as the pressure is removed by the above effect of the horizontal component will lift the axle and through the lever 76 and link 78 will act to keep the roller 82 following and maintaining contact with the spring 54.

I claim:

1. In combination with a vehicle frame, an axle, a wheel carried by the axle, a spring suspension including a T-shape lever pivoted upon the frame at a point spaced from the axle and having one substantially horizontal arm directed toward the axle, a spring cup carried by said last named arm of the T-shape lever, a second spring cup, means connecting the second spring cup to the axle, a coil spring interposed between said spring cups, a roller journaled upon one substantially horizontal arm of the T-shape lever, a laminated spring fixed at one end to the frame and having its free end contacting said roller, a yoke pivotally connected to the said last named arm of the T-shape lever, a second roller upon the yoke, means controlled by the movement of the axle relative to the frame for holding said second roller in contact with the laminated spring, a depending arm upon the T-shape lever, and a lever pivotally connected at one point to said depending arm and flexibly connected at one end to the axle.

2. In combination with a vehicle frame, an axle, a wheel carried by the axle, a spring suspension including a T-shape lever pivoted upon the frame at a point spaced from the axle and having one substantially horizontal arm directed toward the axle, a spring cup carried by said last named arm of the T-shape lever, a second spring cup, means connecting said second spring cup to the axle, a coil spring interposed between said spring cups, a buffer pad carried by the frame for contacting and preventing upward movement of the opposite substantially horizontal arm of the T-shape lever, a roller journaled upon one substantially horizontal arm of the T-shape lever, a laminated spring fixed at one end to the frame and having its free end contacting said roller, a yoke pivotally connected to said last named arm, a second roller carried by said yoke, means controlled by the movement of the axle relative to the frame for holding said second roller in contact with the laminated spring, a depending arm upon said T-shape lever, and a lever pivotally connected at one point to said depending arm and flexibly connected at one end to the axle.

3. In combination with a vehicle frame, an axle, a wheel carried by the axle, a spring suspension including a T-shape lever pivoted upon the frame at a point spaced from the axle and having one substantially horizontal arm directed toward the axle, a roller journaled upon said last named arm, a yoke pivotally connected to said last named arm, a second roller journaled upon said yoke, a laminated spring fixed at one end to the frame and having its free end contacting the tops of both of said rollers, a link pivotally connecting said yoke to the axle, a depending arm upon the T-shape lever, a lever pivotally connected at one end to said depending arm and flexibly connected at its other end to the axle, a spring cup carried by said substantially horizontal arm of the T-shape lever, a second spring cup carried by said second named lever and a coil spring interposed between said spring cups.

4. In combination with a vehicle frame, an axle, a wheel carried by the axle, a spring suspension including a T-shape lever pivoted upon the frame at a point spaced from the axle and having one substantially horizontal arm directed toward the axle, a roller journaled upon said last named arm, a yoke pivotally connected to said last named arm, a second roller journaled upon said yoke, a laminated spring fixed at one end to the frame and having its free end contacting the tops of both of said rollers, a link pivotally connecting said yoke to the axle, a depending arm upon the T-shape lever, a lever pivotally connected at one end to said depending arm and flexibly connected at its other end to the axle, a spring cup carried by said substantially horizontal arm of the T-shape lever, a second spring cup carried by said second named lever and a coil spring interposed between said spring cups, a second substantially horizontal arm upon the T-shape lever, and a buffer pad carried by the frame for contact with the upper edge of said last named arm.

5. In combination with a vehicle frame, an axle, a wheel carried by the axle, a spring suspension including a T-shape lever pivoted upon the frame at a point spaced from the axle and having one substantially horizontal arm directed toward the axle, a roller journaled upon said last named arm, a yoke pivotally connected to said last named arm, a second roller journaled upon said yoke, a laminated spring fixed at one end to the frame and having its free end contacting the tops of both of said rollers, a link pivotally connecting said yoke to the axle, a depending arm upon the T-shape lever, a lever pivotally connected at one end to said depending arm and flexibly connected at its other end to the axle, a spring cup carried by said substantially horizontal arm of the T-shape lever, a second spring cup carried by said second named lever and a coil spring interposed between said spring cups, a lever connected at one end to the axle by a vertical pivot, and a link pivotally connected at one end to the other end of the last named lever and pivotally connected at its other end to the frame.

6. In combination with a vehicle frame, an axle, a wheel carried by the axle, a spring suspension including a T-shape lever pivoted upon the frame at a point spaced from the axle and having one substantially horizontal arm directed toward the axle, a roller journaled upon said last named arm, a yoke pivotally connected to said last named arm, a second roller journaled upon said yoke, a laminated spring fixed at one end to the frame and having its free end contacting the tops of both of said rollers, a link pivotally connecting said yoke to the axle, a depending arm upon the T-shape lever, a lever pivotally connected at one end to said depending arm and flexibly connected at its other end to the axle, a spring cup carried by said substantially horizontal arm of the T-shape lever, a second spring cup carried by said second named lever and a coil spring interposed between said spring cups, a second substantially horizontal arm upon the T-shape lever, a buffer pad carried by the frame for contact with the upper edge of said last named arm, a lever connected at one end to the axle by a vertical pivot and a link pivotally connected at one end to the other end of the last named lever and pivotally connected at its other end to the frame.

7. In combination with a vehicle frame, an axle, a wheel carried by the axle, a spring suspension including a T-shape lever pivoted upon the frame at a point spaced from the axle and having one substantially horizontal arm directed toward the axle, a spring cup carried by said last named arm of the T-shape lever, a second spring cup connected to the axle, a coil spring interposed between said spring cups, an oppositely disposed substantially horizontal arm upon the T-shape lever, a roller journaled upon said last named arm, a yoke pivotally connected to said last named arm, a second roller journaled upon said yoke, a laminated spring fixed at one end to the frame and having its free end contacting the under sides of both of said rollers, a depending arm upon the T-shape lever, a lever fulcrumed intermediate its ends upon said depending arm, one end of said last named lever being flexibly connected to the axle and a link connecting the other end of the lever to said yoke.

8. In combination with a vehicle frame, an axle, a wheel carried by the axle, a spring suspension including a T-shape lever pivoted upon the frame at a point spaced from the axle and having one substantially horizontal arm directed toward the axle, a spring cup carried by said last named arm of the T-shape lever, a second spring cup connected to the axle, a coil spring interposed between said spring cups, an oppositely disposed substantially horizontal arm upon the T-shape lever, a roller journaled upon said last named arm, a yoke pivotally connected to said last named arm, a second roller journaled upon said yoke, a laminated spring fixed at one end to the frame and having its free end contacting the under sides of both of said rollers, a depending arm upon the T-shape lever, a lever fulcrumed intermediate its ends upon said depending arm, one end of said last named lever being flexibly connected to the axle and a link connecting the other end of the lever to said yoke, and a buffer pad upon the frame for contact with the upper edge of said oppositely disposed substantially horizontal arm.

9. In combination with a vehicle frame, an axle, a wheel carried by the axle, a spring suspension including a T-shape lever pivoted upon the frame at a point spaced from the axle and having one substantially horizontal arm directed toward the axle, a spring cup carried by said last named arm of the T-shaped lever, a second spring cup connected to the axle, a coil spring interposed between said spring cups, an oppositely disposed substantially horizontal arm upon the T-shape lever, a roller journaled upon said last named arm, a yoke pivotally connected to said last named arm, a second roller journaled upon said yoke, a laminated spring fixed at one end to the frame and having its free end contacting the under sides of both of said rollers, a depending arm upon the T-shape lever, a lever fulcrumed intermediate its ends upon said depending arm, one end of said last named lever being flexibly connected to the axle and a link connecting the other end of the lever to said yoke, and a buffer pad upon the frame for contact with the upper edge of the yoke.

10. In combination with a vehicle frame, an axle, a wheel carried by the axle, a spring suspension including a T-shape lever pivoted upon the frame at a point spaced from the axle and having one substantially horizontal arm directed toward the axle, a spring cup carried by said last named arm of the T-shape lever, a second spring cup connected to the axle, a coil spring interposed between said spring cups, an oppositely disposed substantially horizontal arm upon the T-shape lever, a roller journaled upon said last named arm, a yoke pivotally connected to said last named arm, a second roller journaled upon said yoke, a laminated spring fixed at one end to the frame and having its free end contacting the under sides of both of said rollers, a depending arm upon the T-shape lever, a lever fulcrumed intermediate its ends upon said depending arm, one end of said last named lever being flexibly connected to the axle and a link connecting the other end of the lever to said yoke, a buffer pad upon the frame for contact with the upper edge of said oppositely disposed substantially horizontal arm, and a second buffer pad upon the frame for contact with the upper edge of the yoke.

WALTER W. WOOD.